(No Model.)
F. P. BEMIS.
BICYCLE OR SIMILAR VEHICLE.
No. 585,421. Patented June 29, 1897.
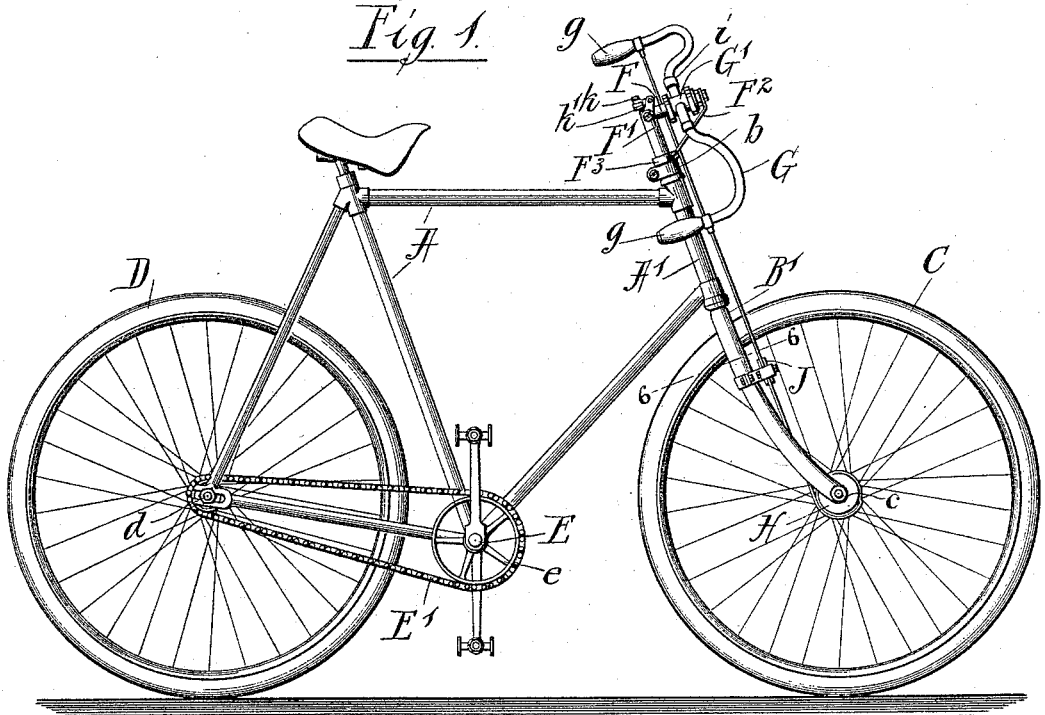
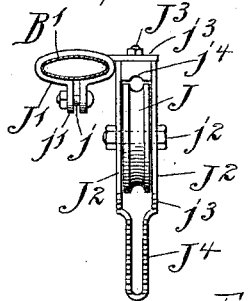
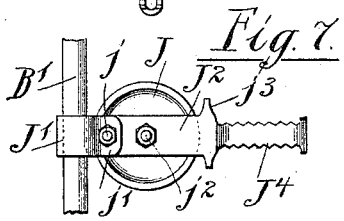
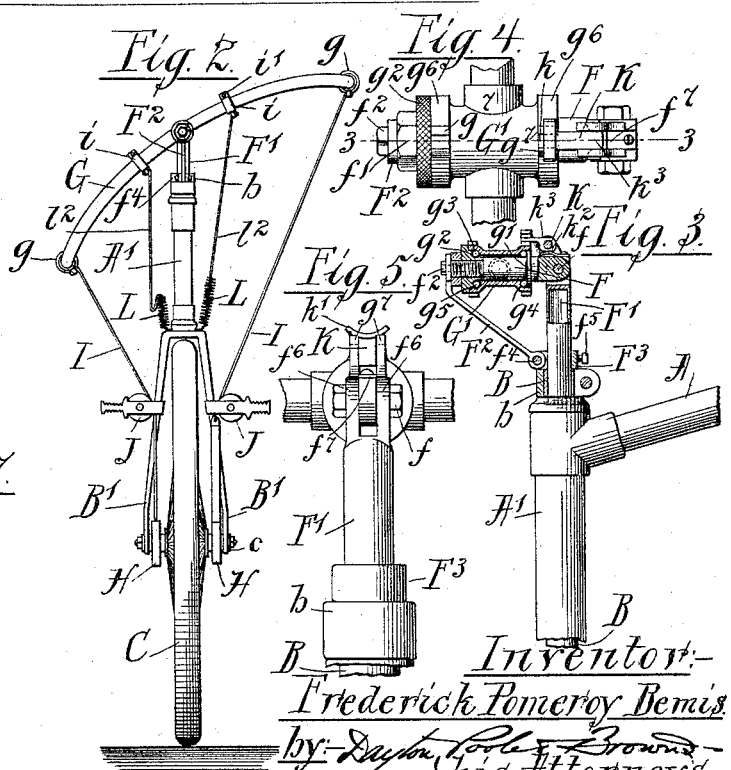
Witnesses:—
Jno. W. Adams
Clinton Hamlink
Inventor:—
Frederick Pomeroy Bemis
by Dayton Pooley Brown
his Attorneys

UNITED STATES PATENT OFFICE.

FREDERICK POMEROY BEMIS, OF DAVENPORT, IOWA.

BICYCLE OR SIMILAR VEHICLE.

SPECIFICATION forming part of Letters Patent No. 585,421, dated June 29, 1897.

Application filed July 18, 1894. Serial No. 517,885. (No model.)

*To all whom it may concern:*

Be it known that I, FREDERICK POMEROY BEMIS, of Davenport, in the county of Scott and State of Iowa, have invented certain new and useful Improvements in Bicycles or Similar Vehicles; and I do hereby declare that the following is a full, clear, and exact description thereof, reference being had to the accompanying drawings, and to the letters of reference marked thereon, which form a part of this specification.

This invention relates to that class of foot-propelled vehicles, such as bicycles and tricycles, which have auxiliary hand-power devices by which propelling power in addition to that exerted by the feet of the operator may be obtained when desired.

The object of the invention is to secure such arrangement of the auxiliary or hand propelling device as will interfere to no great or undesirable extent with the use of the feet in propelling or of the control of the machine in steering and which at the same time shall be simple and durable in construction and reliable in operation.

The invention consists of the matters hereinafter described, and pointed out in the appended claims.

A bicycle or similar vehicle embodying my invention is provided with a foot propelling gear of any ordinary or desired character, the same having suitable connection with one or more of the supporting-wheels of the vehicle and being adapted to operate in the same manner as the corresponding parts of other vehicles. The auxiliary hand propelling device embraces a handle-bar which not only serves for steering or guiding the vehicle by suitable connection with the steering-wheel or that part of the machine-frame in which the said steering-wheel is mounted, but has oscillatory movement on a central transverse axis arranged at an angle with the axis about which it turns in steering the vehicle, and is connected with the steering-wheel by driving connections embracing oscillatory clutch devices adapted to transform the oscillatory movement of the handle-bar into rotary motion adapted to turn the wheel on which the auxiliary driving devices are adapted to operate, such clutches being of that kind which embrace a pulley or drum and a strap or strand which is wound about the same and by means of which rotary motion is given to the drum, and a clutch device or ratchet connecting the drum or wheel. By the use of such clutch the wheel may be turned to any required extent at each stroke of the handle-bar, while the torsional force applied is substantially uniform throughout the stroke. The pivotal axis on which the handle-bar is adapted to turn for driving the vehicle is arranged in such angular relation to the pivotal axis about which the handle-bar turns for steering the vehicle that hand power or pressure applied for driving the vehicle will have no considerable tendency to change the direction of the advance of the machine, while at the same time the plane in which the handle-bar swings when oscillated for driving the vehicle has such relation to the rider's seat or saddle as to enable the rider to easily move or oscillate the handle-bar for driving the vehicle without materially interfering with the action of the feet upon the pedals. Commonly the handle-bar will be oscillated about an axis inclined somewhat rearwardly from a vertical line for the purpose of actuating the steering-wheel, as heretofore common, and will be adapted to oscillate about a second axis at right angles, or nearly so, to the said steering-axis for the purpose of propelling the vehicle, it being obvious that when the handle-bar is thus arranged to oscillate pressure applied thereto for oscillating it in a vertical plane will have little tendency to rotate it about its vertical axis or in a manner to change the direction of motion of the vehicle. While, therefore, the best results may be secured by arranging the said axes of oscillation at right angles with each other, as stated, yet a right angle may be departed from as may be necessary for securing the most favorable position of the handle-bar relatively to the rider, and a right-angled disposition of said axes may be, therefore, departed from to any such slight extent as may be desirable or necessary, provided that the said axes are so arranged that the actuation of the handle-bar for driving the vehicle will not interfere to any great extent with the guiding or steering of the same.

By the employment of oscillatory clutches of the kind described as a means of transmitting motion from the oscillating handle-bar to the wheel which is actuated thereby the operation of the auxiliary or hand driving device is made independent of the foot-power driving devices, so that the rider can time the movements of the handle-bar relatively to the movement of the feet or pedals and also vary its extent of movement or stroke in a manner most advantageous to the rider or which is calculated to secure the most effective application of driving power to the machine, it being obvious that if the connection were made by means of a crank or through positively-acting connection of similar character the motion of the handle-bar would bear a definite relation to that of the pedals, thereby taking from the rider the control of the movement of the said handle-bar. This would be the case especially were the driving connection of the pedals made with one wheel and the hand actuating device connected with another wheel of the vehicle, under which circumstances the relative movements of the foot and hand actuating devices would depend upon the varying angular relation between the two wheels.

In order that the invention may be more readily understood, reference will be now made to the accompanying drawings, in which—

Figure 1 is a view in side elevation of a bicycle embodying my invention. Fig. 2 is a view in front elevation of the front part of the frame. Fig. 3 is a detail sectional view of the head of the steering-post on which the handle-bar is mounted. Fig. 4 is a plan view of the parts shown in Fig. 3. Fig. 5 is a front elevation of the same. Fig. 6 is a detail section, taken on line 6 6 of Fig. 1, showing one of the guide-pulleys on the front fork of the machine. Fig. 7 is a plan view of the parts shown in Fig. 6.

As indicated in said drawings, A is the frame of a bicycle, and B the steering-post, which turns in the tubular steering-head A' of the frame and carries the front forks B' in the usual manner.

C is the front wheel, mounted between the forks B' B', and D is the rear wheel, which is mounted at the rear part of the frame and is driven by a foot driving-gear of familiar construction embracing a crank-shaft E, a sprocket-wheel $e$ on the crank, a sprocket-wheel $d$ on the shaft of the wheel D, and a sprocket-chain E'.

Referring now more particularly to the auxiliary driving device, F is a bearing-spindle mounted rigidly at the upper end of the bearing-head B in the same vertical plane with the front wheel C. Said spindle may extend either forwardly or rearwardly from its point of connection with the head, the same being herein shown as extending forwardly therefrom. In the particular construction herein shown the spindle F is supported on the upper end or head of the steering-post by being attached to a stem F', which fits within the tubular upper end or head of the steering-post and is clamped or held therein in any suitable manner, preferably by means of a clamping-ring $b$, which draws together the opposite sides of the split upper end of the post in a familiar manner.

G is a handle-bar which is employed both for steering the bicycle and as a part of the auxiliary mechanism, and which is provided at its ends with handles $g$ $g$, arranged in any suitable manner, but preferably extending at right angles to the main part of the handle-bar. At the center of said handle-bar is secured a sleeve G', by means of which the handle-bar is pivotally mounted on the spindle F, the said sleeve being adapted to fit over the spindle and to turn or oscillate freely thereon, so as to permit the handle-bar to swing or oscillate in a plane parallel, or nearly so, to the steering-post B and perpendicular to the plane of the front wheel.

The spindle F is arranged approximately at right angles with the steering-post B, but in order to provide for a slight adjustment of its angle relatively to the said post it is connected by a pivotal joint with the supporting-spindle F', such joint comprising in the instance shown a pivot-bolt $f$, which is inserted through overlapping parts of the spindles F and F', and it is provided with nuts by which said parts may be clamped together and held from relative movement. I have shown antifriction ball-bearings between the sleeve G' and the spindle F, the same being formed by means of stationary and removable collars $g'$ and $g^2$ on the spindle having concave annular bearing-faces opposed to similar bearing-faces formed on flanges $g^3$ $g^4$ at the ends of the said sleeve, and balls $g^5$ $g^5$ interposed between said annular bearing-faces.

In order to avoid the bringing of undue strain on the joint between the bearing-spindle F and the supporting-spindle F', I provide a brace-rod $F^2$, which extends from the outer end of the spindle F downwardly to the said spindle F' at a point somewhat below the upper end of the latter. In order to provide for adjustment of the angle of the spindle F with the steering-head, I construct the parts as follows: The said brace-rod $F^2$ is connected at its upper end with the outer end of the spindle F by means of a horizontal pivot-bolt $f^2$. $F^3$ is a sleeve or collar which encircles the spindle F' at a point below its upper end and to which the brace-rod is pivoted at its lower end by means of a pivot-pin $f^4$, engaging laterally-projecting lugs on the sleeve in the manner shown. A set-screw $f^5$, inserted through the sleeve and acting in the spindle F, enables the same to be adjusted vertically on the said spindle and rigidly secured in its changed position. The adjustable sleeve $f^3$ thus arranged serves both as a means of securing the lower end of the brace-rod to the spindle F' and for adjusting the brace-rod to correspond with changes in the angular position of the spindle F, it being obvious that by loosening the set-screw which holds the said sleeve on the spindle F' said sleeve may be moved up or down as the outer end of the spindle F is raised or lowered, and that when the spindle has been adjusted to the desired position and the sleeve is clamped on the spindle F' the spindle F will be rigidly held by the brace-rod from upward or downward movement under pressure coming on the same in actuating the handle-bars.

H H indicate clutches which are mounted on the shaft c of the front wheel C and are connected with the hub of the said wheel by means embracing ratchet-teeth or friction-surfaces in such manner as to transmit rotary motion to the wheel when the external circular shell or casing of the clutch is turned or oscillated in the manner heretofore common in driving devices, of which the so-called "star" or oscillating-lever bicycles are examples. Flexible connecting cords, straps, or strands I extend from the opposite ends of the handle-bar to the clutches H H, said strands being attached to and adapted to be wound upon the external cylinder shells or casings of the clutches and to operate in opposition to coiled retracting-springs, which act to turn the said cylinder-casings backward in a familiar manner. In order that the said strands I I may be guided or held in proper position relatively to the clutches, guide-pulleys J J are mounted on the front forks B' B' of the machine at points above the clutches. Said pulleys are mounted to turn on pivotal axes parallel or approximately parallel with the bearing-spindle F of the handle-bar, so that the strands I I will have no great tendency to escape from the said pulleys in the oscillatory movement of the handle-bar. In case the external shell or pulley of the clutch H is cylindric in form the parts of the strands I I which are wrapped about the said shells will have the form of flat straps, while those parts of the strands which pass over the guide-pulleys J J and reach from the same to the handle-bar will be made of cylindric form in order to run smoothly over said guide-pulleys. In some cases, however, the clutches H H may be provided with peripheral grooves adapted to receive round strands or ropes. In such case the strands I I may be made of cylindric shape and uniform throughout their entire length. In this latter construction the guide-pulleys would not be absolutely necessary and might be dispensed with entirely or located at points close to the clutches, it being obvious that in a construction such as that illustrated, in which the strands are flat and wound on the cylindric outer surfaces of the clutches, the guide-pulleys must be placed at a distance from the clutches greater than the length of the flat part of the strand which is unwound therefrom in order that the flat part of the strand may not reach the said pulley.

In all cases the clutch is so made that the length of the strand or strip wrapped upon the barrel of the clutch will be equal to or greater than the greatest possible stroke of the handle-bar, so that the clutch will operate equally well whatever the length of the stroke may be and whether it be long or short, while at the same time an equal torsional force will be applied to the wheel at all parts of the stroke by reason of the fact that the strand acts constantly at an equal radial distance from the center of rotation of the barrel on which it is wound.

In the operation of a bicycle embracing the general features above described the rider grasps the handle-bar and operates the pedals with his feet in the usual manner. When it is desired to bring the auxiliary or hand driving device into operation, the handle-bar is moved or oscillated by alternately lifting and depressing the opposite ends of the same, the strength of the rider being exerted by pulling upward with one hand while pressing downward with the other. It is obvious that the weight of the rider's body may be utilized to a considerable extent while pressing downward on the handle-bar, and at the same time considerable force may be exerted in pulling upward on the rising end with one hand while pushing downward on the descending end with the other. The natural way of moving the handle-bar will obviously be to pull upward with the right hand while pushing downward with the right foot and similarly pulling upward with the left hand when pushing downward with the left foot. By timing the motions of the hands and feet in this manner the rider is enabled to apply force more effectively to the handle-bar because the upward pull by the hand is in that case opposed by the downward push of the foot, any strain tending to displace the rider from his position on the saddle being thereby avoided. Furthermore, the tendency to lateral movement in the machine produced by the downward movement of the foot on the pedal is counteracted by the effect of the upward pull on the handle-bar at the same side of the machine, which tends to produce an opposite sidewise movement of the bicycle, so that wabbling movement of the bicycle under high speed is thus prevented. The timing of the movements of the hands and feet in the manner described appears to be the most desirable one, not only for the reason stated, but because it corresponds with the natural movement of the limbs in walking. Nevertheless in practice some riders may desire to time the movements of the parts indifferently, and it is obvious that inasmuch as the auxiliary or hand driving device is independent of the foot driving device the rider's movements may be timed in any manner he may desire or find most advantageous. Moreover, by reason of the use of strap-clutches of the character described the rider may vary the length of the stroke of the handle-bars as may be found most advantageous, it being obvious that the auxiliary driving device made as described is independent of the foot driving device with respect to the extent of stroke employed, as well as with respect to the timing of the stroke, so that the rider may move his arms and legs synchronously, whether he be giving a long or short stroke and whether the front wheel revolve at the same or at a greater or less speed than said rear wheel.

As hereinbefore stated, the spindle F is adjustably connected with the supporting-spindle F', so that the angle which these parts make with each other may be varied with the result of changing the inclination of the plane in which the handle-bar oscillates. Such adjustment may be found desirable in order to adapt the bicycle for the use of riders of different sizes or lengths of arms, it being obvious that a considerable variation from the intermediate or right-angled position of the spindle relatively to the steering-post may be made without affecting the operation of the parts. It is obvious that any slight tendency to turn the steering-post which might arise from moving the handle-bars in propelling the vehicle may be counteracted by balancing or other movements of the rider which will tend to prevent swerving or sidewise movement of the machine.

It may sometimes be desired to use a machine equipped with the auxiliary driving device described without bringing the same into use, and in order to enable this to be done I have provided a locking device adapted to hold the handle-bar at the middle or intermediate point of its stroke. Such locking device may be constructed in a variety of ways, one form hereof being shown in the drawings and made as follows: Upon each end of the sleeve G' is a collar $g^6$, having notches $g^7$ $g^7$. One of the notches is arranged to stand vertically above the spindle $f$ when the handle-bar is in its middle position. A detent-lever K is pivoted between lugs $f^6$ $f^6$ at the top of the spindle F in position for engagement of a detent $k$ thereon with the notch $g^7$. Said detent-lever K is provided with laterally-projecting thumb-pieces $k'$ $k'$, arranged in position convenient for the hand of the rider for use in lifting and lowering the free end of the said detent-lever. A leaf-spring $f^7$ is attached to the upper surface of the spindle F and acts upon the part of the lever adjacent to the pivot thereof, and said lever is provided with flat faces $k^2$ $k^3$, either of which may be engaged with the spring, so that the latter will hold the lever either in its downward or locked position or in its position when thrown backwardly free from the sleeve. By the use of the detent-lever described it is obvious that the rider may quickly fasten the handle-bar from movement or release the same whenever desired.

Oscillatory movement of the handle-bar will obviously be limited by the unwinding of the strands J J from the clutch-cylinders, and, if desired, stops may be provided for positively limiting the movement of the said handle-bar.

In order, however, to secure the gradual stoppage of the movement of the handle-bar in either direction, so as to prevent shock or jar in the action of the same, I have provided elastic or spring stops or buffers, which afford no resistance to the movement of the handle-bar through the greater part of the stroke of the same, but which afford gradually-increasing resistance to the movement of the bar at each limit of its stroke. Such spring-stops may be arranged in any one of a great variety of different ways, a simple form thereof being shown in the drawings and being made as follows: L L are coiled expansion-springs, which are secured at their lower ends to the upper ends of the forks B' B', and at their upper ends are attached to flexible strands or cords $l^2$, which are connected with the opposite arms of the handle-bar at points at a considerable distance from the central pivot of the same. The cords $l^2$ hang loose during the greater part of the movement of the handle-bar, but as the same approaches the limit of its stroke the cord, which is at the rising side of the bar, becomes taut, thereby placing the spring under tension, which will increase until the limit of movement of the bar is reached. There is, obviously, no loss of power by reason of the stretching or expansion of the spring in this manner, because the force exerted in placing the spring under tension is exerted on the return stroke of the handle-bar in aiding the opposite movement of the same.

For securing the guide-pulleys J J to the front forks B' of the machine I have provided devices as follows: J' is a metal clip which encircles the fork, Fig. 6, and is adapted to be clamped thereon by means of a clamping-bolt $j$, inserted through outwardly-bent ends $j'$ $j'$ of the clip. The guide-pulley is in this instance mounted on a pivot-pin $j^2$, which is supported at its ends in two parallel arms or plates $J^2$ $J^2$, which are attached to the clip J' at one side of the same by means of a screw-threaded stem $J^3$, which passes through an arm $j^3$ on the clip J', and is secured therein by a nut. The stem $J^3$ is arranged parallel with the axis of the steering-wheel, thereby permitting adjustment of the angle of the guide-pulley relatively to the fork. Said arms $J^2$ $J^2$ are conveniently extended beyond the pulley to form a foot-rest $J^4$, such as is commonly placed on the front forks of bicycles for use when coasting. As a convenient construction the arms $J^2$ $J^2$ are formed by a single plate bent into U shape in the manner illustrated, the central bend of the plate forming the outer end of the foot-rest $J^4$. In order to prevent contact of the foot with the guide-pulley, the plates $J^2$ $J^2$ may be conveniently provided with laterally-projecting parts $j^3$ $j^3$, adapted to limit the inward movement of the foot on the foot-rest. In order to avoid the possibility of the strand I slipping from its place in the groove of the guide-pulley, the plates $J^2$ $J^2$ are extended around the rear or inner edge of the pulley, so as to form a guard $j^4$. The supporting device for the guide-pulley constructed as above described is preferably made alike on both its upper and lower sides, the projections $j^3$ being duplicated, as clearly seen in Fig. 7, so that the said supports may be reversed for changing the position of the pulleys in a manner hereinafter described.

It may be found desirable to shift the handle-bar G forwardly or rearwardly, so as to bring the handles at a greater or less distance from the saddle, according to the size of the rider, or to meet his preference as to the position of the handles. Such adjustment of the handle-bar is provided for in the construction of the bearing-spindle F and its supporting-spindle F', it being obvious that the bearing-spindle F may be turned so as to project either forwardly or rearwardly from the steering-post head, with the result of bringing the handle-bar at a point either at the forward or the rear of the steering-post. This shifting of the bearing-spindle F may be most easily accomplished by loosening the clamping-ring $b$ and turning the spindle F' in the steering-post head. When the bearing-spindle is thus reversed, it is of course necessary to remove the handle-bar therefrom, the sleeve G' being in this operation reversed in position on the bearing-spindle. To permit such reversal of the sleeve G', the latter is made exactly alike at both ends and is provided with two sets of notches $g^7$. It is obvious that when the handle-bar is shifted forwardly or rearwardly, as described, the upper ends of the strands I I will be correspondingly moved or shifted, and in order to prevent said strands from drawing obliquely from the guide-pulleys J it is desirable that said rollers should also be moved or shifted backwardly or forwardly to correspond with the position of the handle-bar. Such bodily adjustment of the pulleys is provided for in the construction shown by so constructing the clip J' that it may be reversed in position on the fork, so as to bring the pulley adjacent to either the front or rear edge of the fork, as desired. The pulley is arranged to stand at the front edge of the fork when the handle-bar is in its forward position, as indicated in the accompanying drawings, and is shifted to the rear edge of the fork when the handle-bar is at its rearward position. The support or frame for the pulley being alike at both sides serves equally well for a foot-rest when in either position, as hereinbefore stated.

The pivotal connection of the plates $J^2 J^2$, which immediately support the pulley with the clip J', enables the angle of the pulley to be accurately adjusted with reference to the forks when shifting the handle-bars bodily, and also in changing the angle of the handle-bars by angular adjustment of the bearing-spindle F, so as to bring said guide-pulleys in position most favorable for the smooth running of the strands I I thereon.

The handle-bar is shown in the drawings as curved downwardly at its ends, this construction being employed to bring the handle in proper position for the rider without making the steering-post unduly low. This construction in the handle-bar in connection with the sleeve G', which is made reversible on the bearing-spindle F in the manner above described, enables the handles to be placed either in a high or low position, according to the wishes of the rider, it being obvious that the handle-bar may either be placed with its concave side downwardly, as seen in the drawings, Fig. 2, or it may be turned on the spindle, so as to bring its concave side uppermost. In such case the handles will be located in a plane above instead of below the spindle when the handle-bar is horizontal. Such change of position in the handle-bar will obviously result in lengthening or shortening the strands I I, but provision for such lengthening or shortening of the strands may be made by making the strands with a surplus of length at their upper ends, so that they may be detached from and refastened to the handle-bars or otherwise shortened or lengthened at their point of connection with the handle-bars.

I have shown the strands I I as secured to the handle-bars by means of sleeves or rings $i$, which encircle the handle-bars and which are provided with clamping-bolts $i'$, by which the sleeves may be secured at any desired points on the handle-bar and at any desired distance from the center of oscillation of the same. This adjustment of the strands on the handle-bar enables the extent of rotary movement in the front wheel, produced by each stroke of the handle-bar, to be varied as desired, or in order to enable the speed at which the front wheel turns to be made to correspond to the speed at which the rear wheel is turned by the foot-propelling devices, it being obviously necessary, in order that the movement of the handle-bars should be synchronous with that of the pedals, that the speed of rotation of the two wheels should be approximately the same. By such adjustment of the points of attachment of the strands to the handle-bars, furthermore, a means is provided for changing the length of the stroke of the handle-bar as may be required by different riders, it being obvious that when the strands are attached nearer the center of movement of the handle-bars the stroke will be longer than when they are attached at a greater distance therefrom, in the same manner as the stroke of the pedals may be changed by shifting the same on the cranks of the foot-power driving device.

While I have shown my invention as applied to a bicycle of ordinary construction, it is obvious that many of the main features thereof may be applied to other wheeled vehicles which are operated by the power of the rider. Some features of the invention are, however, especially applicable to and valuable when used in connection with bicycles, and such features are also herein claimed in connection with the latter form of vehicle. It is also to be noted that the features of construction herein described and claimed may be applied to the so-called "tandem bicycles" or those carrying two or more persons, and that some features of the invention may be applied to vehicles which are steered otherwise than by the hands of the rider.

I claim as my invention—

1. The combination with a bicycle-frame and the front fork thereof, of means acting on the rear wheel for propelling the bicycle by foot-power, a rigid transversely-arranged handle-bar which is centrally pivoted to the steering-post so as to oscillate upon an axis transverse to itself, independently of the oscillatory movement of the front fork, oscillatory clutches embracing winding-barrels mounted concentrically with the steering-wheel and straps or strands wound upon said barrels, and actuating connections between said handle-bar and the said straps or strands of the clutches, whereby the steering-wheel is actuated independently of the rear wheel and the handle-bar may be moved in time with the motion of the feet, substantially as described.

2. The combination with a rear-driving safety-bicycle of a steering mechanism comprising a pivot-stud hinged to the steering-post and adjustable in the plane of the steering-wheel, a handle-bar centrally mounted to oscillate thereon, and means for locking the handle-bar against oscillation, substantially as described.

3. The combination with a rear-driving safety-bicycle, of a steering mechanism comprising a pivot-stud hinged to the steering-post and adjustable in the plane of the steering-wheel, a support secured adjustably to said post and to the outer end of the stud, a handle-bar swiveled upon said stud, and means for locking the handle-bar, substantially as described.

4. The combination with a rear-driving safety-bicycle having means for actuating the rear or driving wheel by foot-power, of an auxiliary driving mechanism applied to the front or steering wheel comprising automatic clutches connected with opposite ends of the steering-wheel hub, a handle-bar centrally journaled on a pivot-stud hinged to the steering-post and adjustable in a plane with the steering-wheel, and means for locking the handle-bar with relation to its pivot-stud, substantially as described.

5. The combination with a bicycle-frame and the front fork thereof, of means acting on the rear wheel for propelling the bicycle by foot-power, a transversely-arranged handle-bar which is pivoted to the steering-spindle so as to oscillate about an axis transverse to itself, independently of the oscillatory movement of said steering-spindle, oscillatory clutches embracing winding-barrels mounted concentrically with the steering-wheel, straps or strands wound upon said barrels, actuating connections between said handle-bar and the said straps or strands of the clutches, and a stop or stops for limiting the oscillatory movement of the handle-bar, said stop or stops embracing a spring or springs, substantially as described.

In testimony that I claim the foregoing as my invention I affix my signature in presence of two witnesses.

FREDERICK POMEROY BEMIS.

Witnesses:
C. CLARENCE POOLE,
W. S. HALL.